Sept. 24, 1940.　　　J. G. KING　　　2,215,511

REFRIGERATING APPARATUS

Filed March 17, 1939

INVENTOR.

JESSE G. KING.

BY Spencer, Hardman and Fehr

HIS ATTORNEYS.

Patented Sept. 24, 1940

2,215,511

UNITED STATES PATENT OFFICE 2,215,511

REFRIGERATING APPARATUS

Jesse G. King, Dayton, Ohio, assignor to General Motors Corporation, Dayton, Ohio, a corporation of Delaware Application March 17, 1939, Serial No. 262,478

11 Claims. (Cl. 62—89)

This invention relates to refrigerating apparatus and particularly to refrigerated ice cream and frozen packaged food storage cabinets.

Cabinets of the ice cream storage type have recently been provided with a single square or rectangular refrigerated compartment, as compared to the plurality of elongated cylindrical sleeve compartments as has been conventional, for the reason that the cabinets are quite frequently employed in relatively small establishments for storing cans or containers of bulk ice cream, packaged ice cream and a variety of other packaged frozen commodities, such for example as individually wrapped chocolate covered frozen pieces, frozen meats, fish, fruits and berries or the like. When such cabinets are desired to be used for the cold storage of a variety of different food products, as stated, it is a problem to properly segregate and uniformly arrange the different products within the refrigerated compartment. It is also a problem to hold cylindrical ice cream cans in a definite position within the square or rectangular cold storage compartment of such refrigerated cabinets and to prevent rotation of the cams during the act of dispensing ice cream therefrom. Therefore, my invention is directed to the provision of an improved refrigerating apparatus by providing the apparatus with a device which can be selectively employed to maintain ice cream cans in a predetermined position within the cold storage compartment of the cabinet and/or employed as a partition to divide the compartment into a plurality of smaller compartments in order to facilitate the storage of packaged food products therein.

An object of my invention is to provide an improved refrigerating apparatus by locating a device therein which will facilitate the storage of various food products in the apparatus and the dispensing of such products therefrom.

Another object of my invention is to provide an improved removable device for use in ice cream cabinets or the like which device is constructed and arranged to serve a two-fold purpose in that it can be employed to prevent rotation of and maintain ice cream cans within a predetermined position within the storage compartment of a refrigerating apparatus and/or employed as a partition to divide the interior of the compartment into a plurality of smaller compartments for segregating certain packaged food products from said other products.

A further object of my invention is to provide a device of the character described in the preceding objects which is adjustable or constructed and arranged to be readily altered for the purpose of receiving and holding ice cream cans of different diameters against rotation and in a definite position within the refrigerated compartment of an ice cream cabinet.

In carrying out the foregoing objects it is a still further and more specific object of my invention to provide a refrigerating apparatus with a device of the character described with is of low manufacturing cost, strong and durable and which has a resilient part adapted to engage ice cream cans that can be adjusted into a position so as not to interfere with the food storage space adjacent a door opening in a cabinet providing access to the storage compartment therein.

Figure 1:
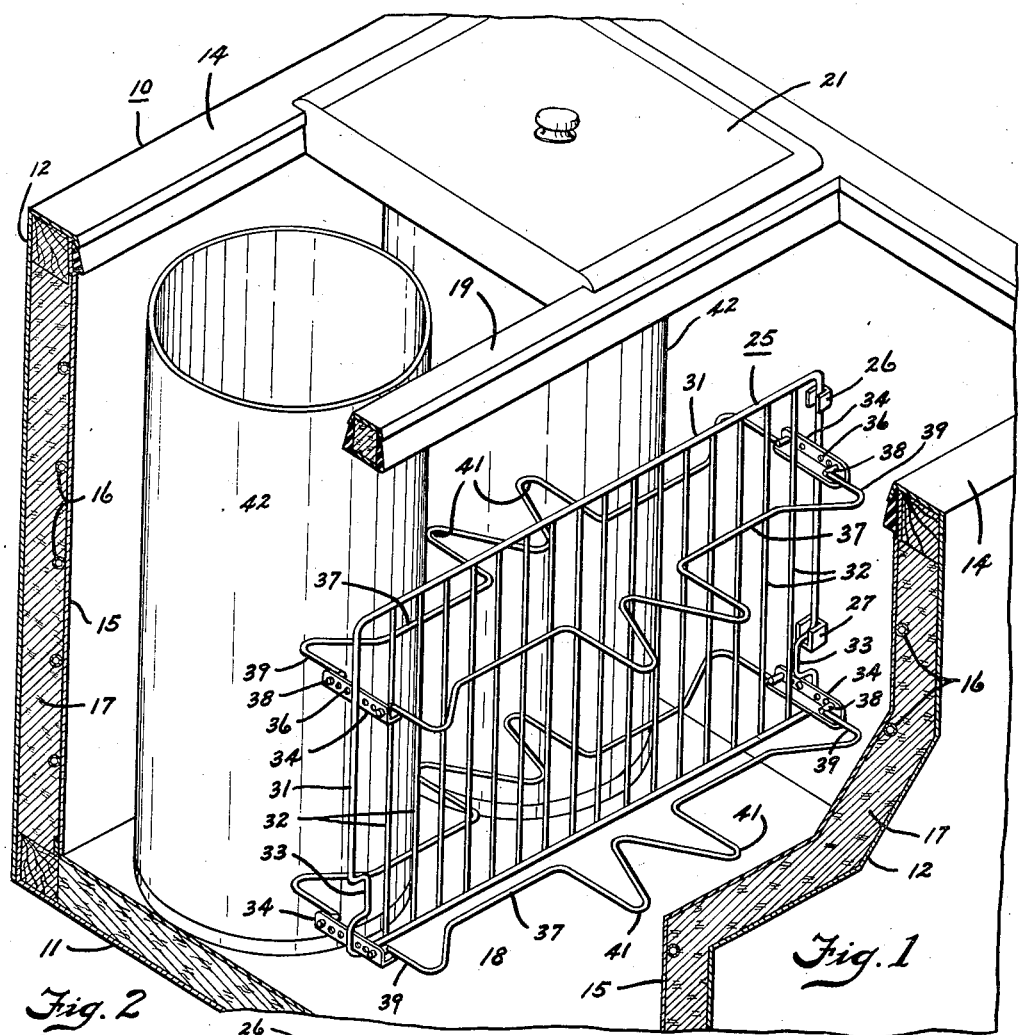
Fig. 1 is a perspective view of an ice cream cabinet partly in section to illustrate the position of a device constructed according to the present invention in a refrigerating apparatus.

Referring to the drawing, for the purpose of illustrating my invention, I have shown in Fig. 1 thereof a refrigerating apparatus including a refrigerator cabinet of the ice cream storage type generally represented by the reference character 10. The cabinet of the refrigerating apparatus comprises an insulated bottom wall 11, a plurality of upright insulated side walls 12 and an insulated top wall 14. A metal liner 15 forms the inner surface of the walls 11 and 12 and this liner has a cooling element or refrigerant evaporating coil 16 secured thereto and embedded in the insulating material 17 disposed around the liner. Cooling element or evaporator 16 is adapted to be connected to a refrigerant condensing and liquefying unit (not shown) for circulating refrigerant thereto and therefrom. The cabinet walls and the liner 15 surround a rectangularly-shaped cold storage compartment 18, the interior of which is cooled by the refrigerating effect produced by the evaporator 16. The top wall 14 of cabinet 10 is provided with a frame or mullion 19 which extends from one side wall to an opposed side wall 12 to form two door openings providing access to the interior of the food storage compartment 18. The access openings are usually closed by covers or lids or the like 21.

The cabinet shown and described differs from the conventional form of ice cream storage cabinets in that the storage compartment is of a rectangular shape instead of the usual practice of providing the cabinet with a plurality of round receptacles adapted to receive cylindrical cans or containers containing bulk ice cream. This type of cabinet has been found to be more accessible because it affords the reception and storage of packaged food products as well as or in addition to cans of ice cream, and it is therefore more useful, particularly in retail establishments or stores wherein packaged ice cream or other frozen delicacies as well as bulk ice cream are dispensed. While I am aware of the fact that others have heretofore employed various devices in an attempt to prevent turning or rotation of cylindrical cans or containers within round receptacles provided in ice cream cabinets these devices, because of their round construction, cannot be used in a cabinet of more modern design such as is herein disclosed. Therefore, I was confronted with the problem of maintaining ice cream within a definite predetermined position within a rectangularly-shaped cold storage compartment and the problem of preventing movement of the cans or containers within the compartment and turning thereof during the act of dispensing ice cream therefrom. To overcome these problems I have provided a device which can be removably placed in the refrigerator cabinet disclosed and which has a resilient part forceably engaging an ice cream can to prevent its rotation. This device is generally represented by the reference character 25 and is vertically supported within the storage compartment 18 of cabinet 10 by sets of mounting means located on opposite side walls 12 of the cabinet. Each set of the mounting means includes metal brackets 26 and 27 secured in vertical alignment with one another to the liner 15 by being welded thereto. It will be noted that each set of brackets 26 and 27 are disposed below and in vertical alignment with the frame or mullion 19 and that the upper brackets 26 are of a U-shaped form while the lower brackets 27 have a closed bottom wall portion which receives and supports the device 25 in a vertical position within the compartment 18 under the mullion 19.

Figure 2:
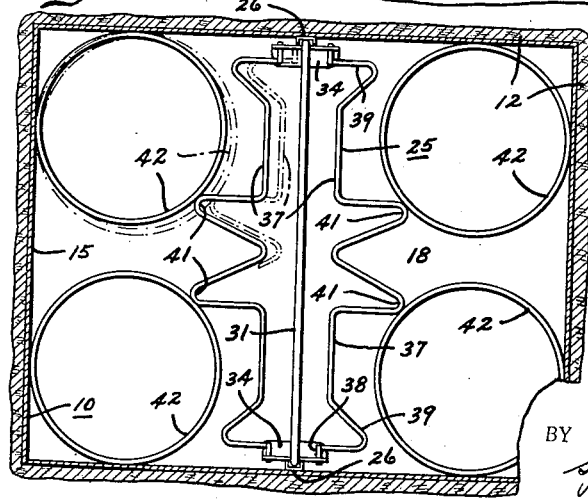
Fig. 2 is a fragmentary horizontal section of the ice cream cabinet showing a plan view of the device of the present invention.

The device 25 is substantially flat and of a general rectangular contour so as to be in the form of a partition and comprises a heavy metal bounding rim 31 having a plurality of metal bars 32 extending from the top to the bottom portion of the rim 31 and welded or otherwise suitably secured thereto. The bars 32 are arranged in spaced apart relation along the length of the device 25 and form a partitioning part therefor which divides the compartment 18 into two smaller compartments. At the ends of device 25 the rim 31 thereof is bent inwardly as at 33, to provide a shoulder on rim 31 which is received in the socket portion, formed by the closed bottom wall part, of the lower mounting brackets 27 to thus support the device in spaced relation to the top and bottom walls of compartment 18. It is to be noted that the inwardly bent or formed parts 33 of rim 31 are of sufficient height to clear the bracket 27 when device 25 is elevated and its bottom portion tilted outwardly away from the brackets 27. This tilting movement of device 25 is one of the movements employed to detach and remove the device from the refrigerator cabinet, which removal operation will be more fully described hereinafter. A pair of L-shaped brackets 34 are welded or otherwise permanently secured to the rim 31 at each end of the device 25. Each of the pairs of brackets 34 have a series of horizontally spaced apart holes 36 provided therein. The upper and lower brackets 34 on device 25 carry wire members 37 two of which are disposed on each side of the device. Each wire member 37 includes a pair of legs 38 that are positioned in corresponding opposed holes 36 provided in the opposed brackets 34 to thereby pivotally mount the members 37 upon the device 25. The wire members 37 as shown in Figs. 1 and 2 lay in a horizontal position or at right angles to the vertical cross rods 32 and an outwardly extending portion 39 thereof, adjacent the legs 38, abuts or rests upon the horizontal bottom part of the L-shaped brackets 34 to support the members 37. Each wire member 37 is also provided with two reversely bent portions 41 which extend outwardly from the main part thereof and which reversely bent portions are resilient and adapted to engage and apply force to the wall of ice cream cans or containers 42 located within the compartment 18 of cabinet 10. Normally the reversely bent portions 41 of members 37 about a lower and an upper part of the ice cream cans or containers 42 and maintain the cans in engagement with two upright walls of the compartment 18 at the corners of the rectangularly-shaped cold storage compartment. Thus, the cans or containers 42 are definitely located within the compartment 18 and their frictional engagement with the walls thereof, caused by force exerted upon the containers by the resilient reversely bent portions 41 of members 37, prevents the cans or containers 42 from moving or turning during the act of dipping or dispensing bulk ice cream therefrom. The reversely bent portion at the ends of members 37 adjacent the end parts 39 thereof provide members 37 with resilient ends that can be readily sprung inwardly away from the brackets 34 in order to permit the legs 38 thereof to be removed from their one set of mounting holes 36 and inserted into another set of the mounting holes 36. Such re-location of the members 37 positions same more closely adjacent the vertical partitioning part of device 25 and thereby affords a greater space between the reversely bent portions 41 of members 37 and the corner walls of the compartment 18 for the reception of ice cream cans or containers of larger diameter. Such re-location of members 37 with respect to the vertical partitioning part of device 25 is illustrated by the dot-dash line showing in Fig. 2, and it is thus obvious that my device can be adjusted to carry out the objects of the invention when larger diametered ice cream cans or containers are placed in the cabinet 10. In order to prevent damaging the device 25, its outwardly extending parts or members 37 are moved upwardly about their pivotal mountings against the vertical partitioning part thereof during the act of removing ice cream cans from the compartment 18 or during the act of inserting cans into the compartment. After the ice cream cans 42 are placed in the compartment 18 the members 37 of device 25 are lowered into a horizontal position with the reversely bent resilient portions 41 thereof forced against the cans to frictionally hold the cans in a definite position.

Figure 3:
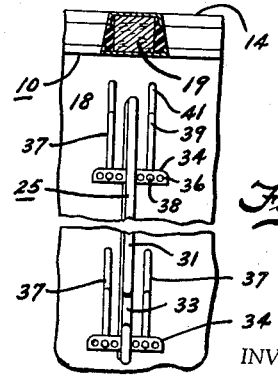
Fig. 3 is a fragmentary vertical section of the cabinet showing an end view of the device located therein.

In addition to my improved device serving to maintain ice cream cans within the corners of the refrigerated compartment 18 of cabinet 10, the device is also constructed and arranged to permit the members 37 thereof to be swung from a horizontal position into a vertical position as shown in Fig. 3 of the drawing for utilizing the cabinet 10 and its entire compartment 18 for the storage of packaged food products. In the showing of the device in Fig. 3 it will be noted that the members 37 are located below the cabinet mullion or frame 19 and that they do not, therefore, interfere with the placing of packaged ice cream or other packaged articles in the compartment 18 through the access openings and do not interfere with the removal of such articles from the compartment. It is also to be noted that the device 25, when in the folded position shown in Fig. 3 of the drawing, serves as a partition for dividing the cold storage compartment 18 into two smaller compartments. The partition formed by the device 25, therefore, permits certain packaged food products stored within the refrigerating apparatus to be segregated from certain other packaged food products to thereby facilitate and save time in the dispensing of products from the refrigerator cabinet. It is to be understood that various combinations and arrangements of food storage within the compartment 18 of cabinet 10 can be had by selectively manipulating the device 25 as desired. For example, the compartment 18 of cabinet 10 may be employed for the storage of bulk ice cream in the cans or containers 42 as shown in Figs. 1 and 2 or the compartment 18 may be employed entirely for the purpose of storing packaged frozen foods as illustrated by the folded position of the device 25 in Fig. 3. On the other hand, one side or one of the smaller compartments of the compartment 18 may contain ice cream cans with the members 37 of device 25 located in a horizontal position to hold the cans against the compartment walls while the other side or the other smaller compartment of compartment 18 may contain packaged products with the members 37 of device 25 folded so as to lay parallel with the vertical part of the device. In the latter arrangement, the device 25 provides a partition which prevents the packaged products from being shifted or moved over into the one side of compartment 18 containing the ice cream cans.

In order to remove the device 25 from the compartment 18 of the refrigerating apparatus the members 37 thereof are moved into a vertical position as shown in Fig. 3 or into parallel relation with the vertical rods 32; then the device is elevated within the upper brackets 26 so as to bring the bent-in parts 33 of rim 31 into horizontal alignment with the lower brackets 27. While the bent-in parts 33 of rim 31 are in horizontal alignment with the lower mounting brackets 27 the lower portion of device 25 is tilted or swung in a horizontal direction whereupon the bent-in parts 33 of rim 31 at the ends of the device will pass over the brackets 27. Thereafter, the device 25 is lowered, while holding same in the now tilted position thereof, a sufficient distance to cause its rim 31 at the top of the structure to move or drop out of the upper brackets 26. The device 25 thus being detached or released from its mounting brackets 26 and 27 may now readily be lifted from the compartment 18 through one of the door openings adjacent the frame or mullion 19.

From the foregoing it will be seen that I have provided an improved refrigerating apparatus by installing therein a device which facilitates the storage of food products in the cabinet thereof and facilitates the removal or dispensing of food products from the cabinet. The device also maintains the ice cream cans in direct heat exchange relation with the refrigerant evaporator secured to the compartment liner and thereby provides an improved refrigerating apparatus in that heat is directly withdrawn from the contents of the can to the evaporator. Parts of the partitioning device employed in my improved refrigerating apparatus can be moved relative to other parts thereof to thereby selectively locate the movable parts in one of a plurality of positions to afford a two-fold use for the refrigerating apparatus. My improved partitioning device in the refrigerating apparatus disclosed can be quickly and readily adjusted to accommodate the storage of different diametered ice cream cans in the refrigerated compartment. The partitioning device in the present refrigerating apparatus is of low manufacturing cost, strong and durable and can be readily detached from walls of the refrigerated compartment and removed from the refrigerating apparatus.

While the form of embodiment of the invention as herein disclosed, constitutes a preferred form, it is to be understood that other forms might be adopted, all coming within the scope of the claims which follow.

What is claimed is as follows:

1. A refrigerating apparatus comprising in combination, a cabinet having a top, bottom and a plurality of upright walls forming a rectangularly shaped compartment therein, means for cooling said compartment, the top wall of said cabinet having an opening therein providing access to said compartment, a cylindrical container disposed within said compartment and accessible through the opening in said cabinet top wall, means within said compartment extending between and being attached to opposed upright walls thereof, and said last named means having a part extending outwardly therefrom engaging said container and forcing same against one of said opposed upright walls and an adjacent upright wall of said compartment.

2. A refrigerating apparatus comprising in combination, a cabinet having a top, bottom and a plurality of upright walls forming a rectangularly shaped compartment therein, means for cooling said compartment, the top wall of said cabinet having an opening therein providing access to said compartment, a cylindrical container disposed within said compartment and accessible through the opening in said cabinet top wall, means within said compartment extending between and being attached to opposed upright walls thereof, said last named means having a part extending outwardly therefrom engaging said container and forcing same against one of said opposed upright walls and an adjacent upright wall of said compartment, and said part of said last named means being adjustable to change its outward extension relative to the main part thereof.

3. A refrigerating apparatus comprising in combination, a cabinet having a top, bottom and a plurality of upright walls forming a rectangularly shaped compartment therein, means for cooling said compartment, the top wall of said cabinet having an opening therein providing access to said compartment, a cylindrical container disposed within said compartment and accessible through the opening in said cabinet top wall, means within said compartment extending between and being attached to opposed upright walls thereof, and said last named means having parts disposed at different elevations therealong extending outwardly therefrom engaging an upper and a lower portion of said container and forcing same against one of said opposed upright walls and an adjacent upright wall of said compartment.

4. A refrigerating apparatus comprising in combination, a cabinet having a top, bottom and a plurality of upright walls forming a rectangularly shaped compartment therein, means for cooling said compartment, the top wall of said cabinet having an opening therein providing access to said compartment, a cylindrical container disposed within said compartment and accessible through the opening in said cabinet top wall, means within said compartment extending between and being attached to opposed upright walls thereof, said last named means having parts disposed at different elevations therealong extending outwardly therefrom engaging an upper and a lower portion of said container and forcing same against one of said opposed upright walls and an adjacent upright wall of said compartment, and said parts of said last named means being adjustable to change their outward extension relative to the main part thereof.

5. A refrigerating apparatus comprising in combination, a cabinet having a top, bottom and a plurality of upright walls forming a rectangularly shaped compartment therein, means for cooling said compartment, the top wall of said cabinet having openings therein providing access to said compartment, a vertically disposed partition within said compartment attached to and extending between opposed upright walls thereof to divide the compartment into a plurality of smaller compartments, a cylindrical container disposed within one of said smaller compartments and accessible through one of the openings in said cabinet top wall, and said partition having a part extending outwardly from at least one side thereof engaging said container and forcing same against one of said opposed upright walls and an adjacent upright wall of said compartment.

6. A refrigerating apparatus comprising in combination, a cabinet having a top, bottom and a plurality of upright walls forming a rectangularly shaped compartment therein, means for cooling said compartment, the top wall of said cabinet having openings therein providing access to said compartment, a vertically disposed partition within said compartment attached to and extending between opposed upright walls thereof to divide the compartment into a plurality of smaller compartments, a cylindrical container disposed within one of said smaller compartments and accessible through one of the openings in said cabinet top wall, and said partition having vertically spaced apart parts extending outwardly from at least one side thereof engaging said container and forcing same against one of said opposed upright walls and an adjacent upright wall of said compartment.

7. A refrigerating apparatus comprising in combination, a cabinet having a top, bottom and a plurality of connecting upright walls forming a rectangularly shaped compartment therein, means for cooling said compartment, the top wall of said cabinet having openings therein providing access to said compartment, a vertically disposed substantially rigid partition within said compartment attached to and extending between opposed upright walls thereof to divide the compartment into a plurality of smaller compartments, a cylindrical container disposed within one of said smaller compartments and accessible through one of the openings in said cabinet top wall, said partition having a resilient part pivotally mounted thereupon and extending outwardly from one side thereof, and said resilient part of said partition engaging said container and forcing same against one of said opposed upright walls and an adjacent upright wall of said compartment.

8. A refrigerating apparatus comprising in combination, a cabinet having a top, bottom and a plurality of connecting upright walls forming a rectangularly shaped compartment therein, means for cooling said compartment, the top wall of said cabinet having openings therein providing access to said compartment, a vertically disposed substantially rigid partition within said compartment attached to and extending between opposed upright walls thereof to divide the compartment into a plurality of smaller compartments, a cylindrical container disposed within one of said smaller compartments and accessible through one of the openings in said cabinet top wall, said partition having a resilient part pivotally mounted thereupon and extending outwardly from one side thereof, said resilient part of said partition engaging said container and forcing same against one of said opposed upright walls and an adjacent upright wall of said compartment, and said resilient part being adjustable relative to said partition to vary its extension outwardly thereof.

9. A refrigerating apparatus comprising in combination, a cabinet having a top, bottom and a plurality of connecting upright walls forming a rectangularly shaped compartment therein, means for cooling said compartment, the top wall of said cabinet having openings therein providing access to said compartment, a vertically disposed substantially rigid partition within said compartment attached to and extending between opposed upright walls thereof to divide the compartment into a plurality of smaller compartments, a cylindrical container disposed within one of said smaller compartments and accessible through one of the openings in said cabinet top wall, said partition having a resilient part movably mounted thereupon and extending outwardly from a side thereof, said resilient part of said partition engaging said container and forcing same against one of said opposed upright walls and an adjacent upright wall of said compartment, and said partition being detachable from said compartment walls and removable from the compartment through one of the openings in said cabinet top wall.

10. A refrigerating apparatus comprising in combination, a cabinet having a top, bottom and a plurality of upstanding walls forming a compartment therein provided with a plurality of vertical corners, means for cooling said compartment, the top wall of said cabinet having an opening therein providing access to said compartment, a cylindrical container disposed within said compartment adjacent one of the vertical corners thereof and accessible through the opening in said cabinet top wall, means within said compartment extending between and held in position by walls thereof, and said last named means having a part extending outwardly therefrom engaging said container and forcing same against one of the upstanding walls and an adjacent upstanding wall of said compartment.

11. A refrigerating apparatus comprising in combination, a cabinet having a top, bottom and a plurality of upstanding walls forming a compartment therein provided with a plurality of vertical corners, means for cooling said compartment, the top wall of said cabinet having an opening therein providing access to said compartment, a plurality of cylindrical containers within said compartment, each of said containers being disposed adjacent a vertical corner of said compartment and accessible through the opening in said cabinet top wall, and means within said compartment having a part thereof engaging each of said containers and forcing same against one of the upstanding walls and an adjacent upstanding wall of said compartment.

JESSE G. KING.